(12) United States Patent
Minakawa

(10) Patent No.: US 6,900,929 B2
(45) Date of Patent: May 31, 2005

(54) NOISE FIGURE MEASURING SYSTEM FOR OPTICAL AMPLIFIER

(75) Inventor: Shinji Minakawa, Kawaski (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 10/052,537

(22) Filed: Jan. 23, 2002

(65) Prior Publication Data
US 2003/0053193 A1 Mar. 20, 2003

(30) Foreign Application Priority Data
Sep. 14, 2001 (JP) .................................... 2001-279647

(51) Int. Cl.$^7$ ............................................. H01S 3/00
(52) U.S. Cl. ...................... 359/337; 359/337; 356/73.1
(58) Field of Search ............................ 359/337, 73.1

(56) References Cited

U.S. PATENT DOCUMENTS

| | | | | |
|---|---|---|---|---|
| 6,204,950 B1 | * | 3/2001 | Nishikawa ................... | 359/244 |
| 6,212,003 B1 | * | 4/2001 | Komazawa et al. ...... | 359/341.1 |
| 6,226,117 B1 | * | 5/2001 | Hentschel ................... | 359/337 |
| 6,480,318 B2 | * | 11/2002 | Mori et al. ................... | 359/264 |
| 6,542,233 B1 | * | 4/2003 | Bray et al. ................... | 356/324 |
| 6,751,012 B1 | * | 6/2004 | Nissov et al. ................ | 359/337 |

FOREIGN PATENT DOCUMENTS

| | | |
|---|---|---|
| JP | 09-018391 A | 1/1997 |
| JP | 09-214035 A | 8/1997 |

* cited by examiner

Primary Examiner—Mark Hellner
(74) Attorney, Agent, or Firm—Staas & Halsey LLP

(57) ABSTRACT

A noise figure measuring system including a first optical amplifier whose noise figure is to be measured, a plurality of light sources for outputting a plurality of optical signals having different wavelengths, respectively, an optical multiplexer for wavelength division multiplexing the plurality of optical signals output from the light sources to obtain WDM signal light, and a second optical amplifier for amplifying the WDM signal light output from the optical multiplexer. The noise figure measuring system further includes an optical spectrum measuring unit for measuring output signals from the first and second amplifiers, a power deviation detecting unit for detecting a deviation in power between the optical signals of the WDM signal light to be input into the first optical amplifier, and a light source power control unit for controlling the light sources so that the powers of the optical signals of the WDM signal light to be input into the first optical amplifier becomes substantially equal to each other. Measured data obtained by the optical spectrum measuring unit is stored into a memory, and the noise figure of the first optical amplifier is computed by a noise figure computing unit according to the measured data stored in the memory.

18 Claims, 11 Drawing Sheets

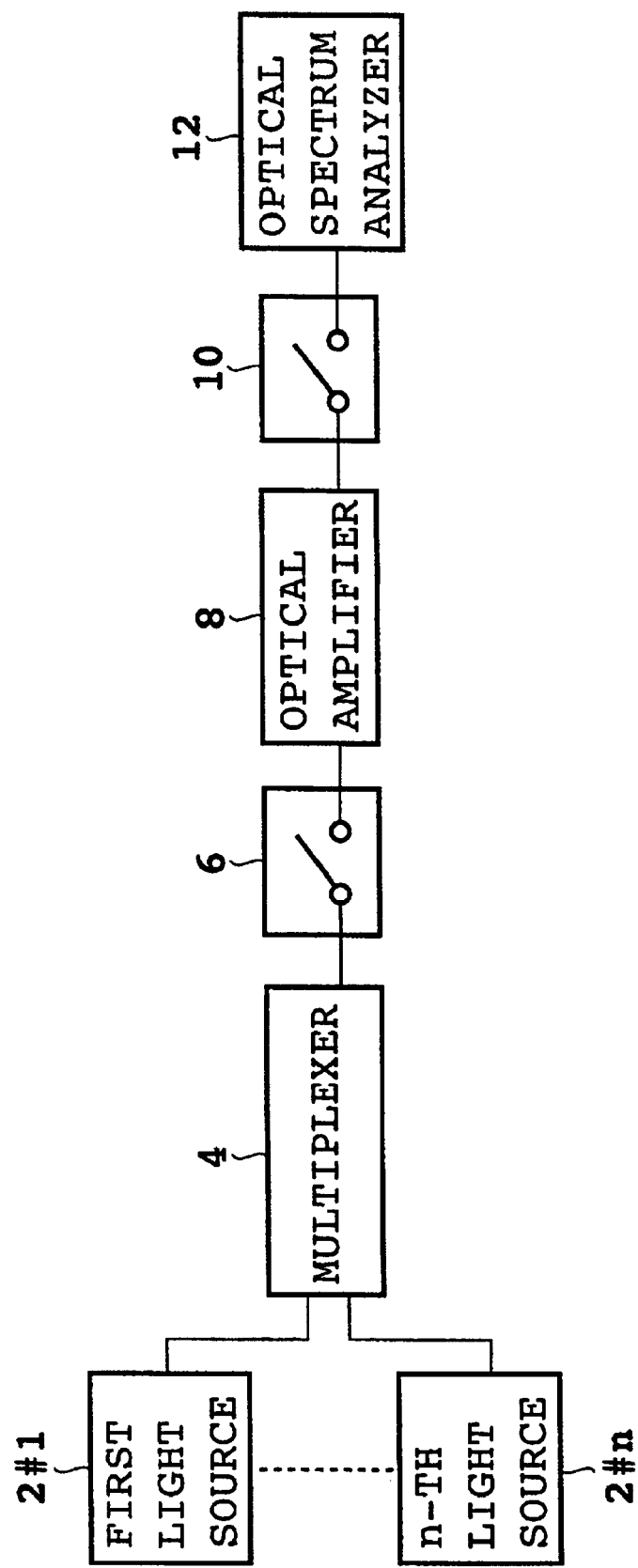

FIG.2A PRIOR ART
FIRST OPTICAL SWITCH 
SECOND OPTICAL SWITCH 
FIG.2B PRIOR ART
FIRST OPTICAL SWITCH 
SECOND OPTICAL SWITCH 

though the WDM signal light comprises multiple wavelengths the scale of the measuring system does not enlarge with an increase in the number of multiplexed wavelengths.

NOISE FIGURE MEASURING SYSTEM FOR OPTICAL AMPLIFIER

BACKGROUND OF THE INVENTION

1. Field of the Invention

The present invention relates to a noise figure measuring system for efficiently measuring the noise figure of an optical amplifier for amplifying wavelength division multiplexed (WDM) signal light over the entire operational wavelength band of the optical amplifier.

2. Description of the Related Art

As a method of measuring the noise figure of an optical amplifier for amplifying WDM signal light, some noise figure measuring methods are known. Typical noise figure measuring methods include a pulse method, a probe method, and an interpolation method. FIG. 1 is a block diagram showing the pulse method. A plurality of optical signals having different wavelengths are output from a plurality of light sources 2#1 to 2#n (n is the number of wavelengths for measurement), respectively. The optical signals output from the light sources 2#1 to 2#n are wavelength division multiplexed by a multiplexer 4 to obtain WDM signal light. The WDM signal light output from the multiplexer 4 is input through a first optical switch 6 into an optical amplifier 8 whose noise figure is to be measured. Output light from the optical amplifier 8 is input through a second optical switch 10 into an optical spectrum analyzer 12. In the optical spectrum analyzer 12, signal light or amplified spontaneous emission light (ASE light) is measured.

FIG. 2A shows the operation of the first and second switches 6 and 10 in measuring the signal light. As shown in FIG. 2A, the first and second optical switches 6 and 10 are simultaneously turned on and off to measure the level of the signal light in the optical spectrum analyzer 12. FIG. 2B shows the operation of the first and second optical switches 6 and 10 in measuring the ASE light. As shown in FIG. 2B, the first and second optical switches 6 and 10 are operated in such a manner that when the first optical switch 6 is turned on, the second optical switch 10 is turned off, whereas when the first optical switch 6 is turned off, the second optical switch 10 is turned on, thereby measuring the level of the ASE light in the optical spectrum analyzer 12. That is, when the input light to the optical amplifier 8 is cut off, the level of the ASE light is measured to obtain the noise figure of the optical amplifier 8.

In the pulse method, it is required to prepare many light sources covering a desired wavelength band where the noise figure is to be measured. Further, special high-speed optical switches are required. Accordingly, the scale of a measuring system becomes larger with an increase in the number of multiplexed wavelengths, thus causing an increase in cost.

FIG. 3A is a block diagram showing the probe method. The probe method employs several light sources 2#1 to 2#m for stabilizing the characteristics of an optical amplifier 8 whose noise figure is to be measured and a probe light source 14 for measurement of the noise figure. Optical signals from the light sources 2#1 to 2#m and probe light from the probe light source 14 are wavelength division multiplexed by a multiplexer 4 to obtain WDM signal light. The WDM signal light is then input into the optical amplifier 8. Output light from the optical amplifier 8 is measured by an optical spectrum analyzer 12. FIG. 3B illustrates the operation of the probe method. Several optical signals 3 for stabilizing the characteristics of the optical amplifier 8 are spaced a given wavelength, and probe light 15 output from the probe light source 14 operates to sweep each optical signal 3 as shown by an arrow 16, thereby performing the measurement over the entire wavelength band to obtain the noise figure of the optical amplifier 8.

In the probe method, several light sources and one probe light source are merely required irrespective of the number of multiplexed wavelengths, so that the scale of a measuring system is not enlarged with an increase in the number of multiplexed wavelengths. However, the measurement at one time is performed for the characteristics at one wavelength, so that the measurement time increases with an increase in the number of wavelengths for measurement.

FIG. 4A is a block diagram showing the interpolation method. A plurality of optical signals output from a plurality of light sources 2#1 to 2#n are wavelength division multiplexed by a multiplexer 4 to obtain WDM signal light. The WDM signal light from the multiplexer 4 is input into an optical amplifier 8 whose noise figure is to be measured. Output light from the optical amplifier 8 is measured by an optical spectrum analyzer 12. FIG. 4B illustrates the operation of the interpolation method. As shown in FIG. 4B, ASE light 17 is removed from the spectrum of the output light to estimate the level of ASE light included in the signal light 3, thereby obtaining the noise figure of the optical amplifier 8.

Like the pulse method, the interpolation method is also required to prepare many light sources covering a desired wavelength band where the noise figure is to be measured, so that the scale of a measuring system becomes larger with an increase in the number of multiplexed wavelengths. Further, the estimation of the ASE level becomes more difficult with a decrease in wavelength spacing, causing an increase in measurement error.

SUMMARY OF THE INVENTION

It is therefore an object of the present invention to provide a noise figure measuring system which can efficiently measure the noise figure of an optical amplifier for amplifying WDM signal light over the entire operational wavelength band of the optical amplifier.

In accordance with an aspect of the present invention, there is provided a noise figure measuring system comprising a first optical amplifier whose noise figure is to be measured; a plurality of light sources for outputting a plurality of optical signals having different wavelengths, respectively; an optical multiplexer for wavelength division multiplexing the plurality of optical signals output from the light sources to obtain WDM signal light; a second optical amplifier for amplifying the WDM signal light output from the optical multiplexer; an optical spectrum measuring unit; switch means for selectively inserting the first optical amplifier in an optical transmission line between the second optical amplifier and the optical spectrum measuring unit; a power deviation detecting unit for detecting a deviation in power between the optical signals of the WDM signal light amplified by the second amplifier and to be input into the first amplifier; a light source power control unit connected to the power deviation detecting unit and the light sources for controlling the light sources so that the powers of the optical signals of the WDM signal light to be input into the first optical amplifier becomes substantially equal to each other; and a noise figure computing unit for computing the noise figure of the first optical amplifier according to measured data obtained by the optical spectrum measuring unit.

Preferably, the noise figure measuring system further comprises an optical attenuator provided downstream of the second amplifier; an optical power measuring unit for measuring the power of the WDM signal light to be input into the first optical amplifier; and an optical input power setting unit for controlling the optical attenuator so that the power measured by the optical power measuring unit becomes a desired value. The switch means comprises a first optical switch interposed between the first optical amplifier and the second optical amplifier for selectively supplying the WDM signal light from the second optical amplifier to the first optical amplifier; and a second optical switch selectively connectable to the first optical amplifier and the first optical switch.

The measured data comprises data on input power and output power of the first optical amplifier when each of the light sources is driven with a first power set value, and data on input power and output power of the first optical amplifier when each of the light sources is driven with a second power set value higher than the first power set value. Preferably, the noise figure measuring system further comprises a memory connected to the light source power control unit and having a first power set value for use in driving each light source with a first power and a second power set value for use in driving each light source with a second power higher than the first power.

In accordance with another aspect of the present invention, there is provided a noise figure measuring system comprising a first optical amplifier whose noise figure is to be measured; a plurality of light sources for outputting a plurality of optical signals having different wavelengths, respectively; an optical multiplexer for wavelength division multiplexing the plurality of optical signals output from the light sources to obtain WDM signal light; a plurality of first optical attenuators interposed between the plurality of light sources and the optical multiplexer, respectively; a second optical amplifier for amplifying the WDM signal light output from the optical multiplexer; an optical spectrum measuring unit; switch means for selectively inserting the first optical amplifier in an optical transmission line between the second optical amplifier and the optical spectrum measuring unit; a power deviation detecting unit for detecting a deviation in power between the optical signals of the WDM signal light amplified by the second amplifier and to be input into the first amplifier; a light source power control unit connected to the power deviation detecting unit and the first optical attenuators for controlling the first optical attenuators so that the powers of the optical signals of the WDM signal light to be input into the first optical amplifier becomes substantially equal to each other; and a noise figure computing unit for computing the noise figure of the first optical amplifier according to measured data obtained by the optical spectrum measuring unit.

In accordance with a further aspect of the present invention, there is provided a measuring system comprising a first optical amplifier subjected to measurement on ASE power or amplification factor; optical signal outputting means for outputting a plurality of first optical signals having different wavelengths with a first power each and for outputting a plurality of second optical signals having different wavelengths with a second power each; multiplexing means for wavelength division multiplexing the first optical signals to obtain first WDM signal light and for wavelength division multiplexing the second optical signals to obtain second WDM signal light; a second optical amplifier for amplifying the first WDM signal light and the second WDM signal light; power control means for equalizing the powers of the first WDM signal light and the second WDM signal light; measuring means for measuring the power of the first optical signal having a given wavelength in the first WDM signal light and the power of the second optical signal having the given wavelength in the second WDM signal light after equalization control by the power control means and for measuring the powers of the first and second optical signals at the given wavelength after amplification of the first and second WDM signal lights by the first optical amplifier; and means for computing the ASE power or the amplification factor of the first optical amplifier at the given wavelength from a result of measurement by the measuring means.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a block diagram showing a pulse method in the prior art;

FIG. 2A is a timing chart for illustrating the operation of the pulse method in measuring signal light;

FIG. 2B is a timing chart for illustrating the operation of the pulse method in measuring ASE light;

DETAILED DESCRIPTION OF THE PREFERRED EMBODIMENTS

Figure 3A:
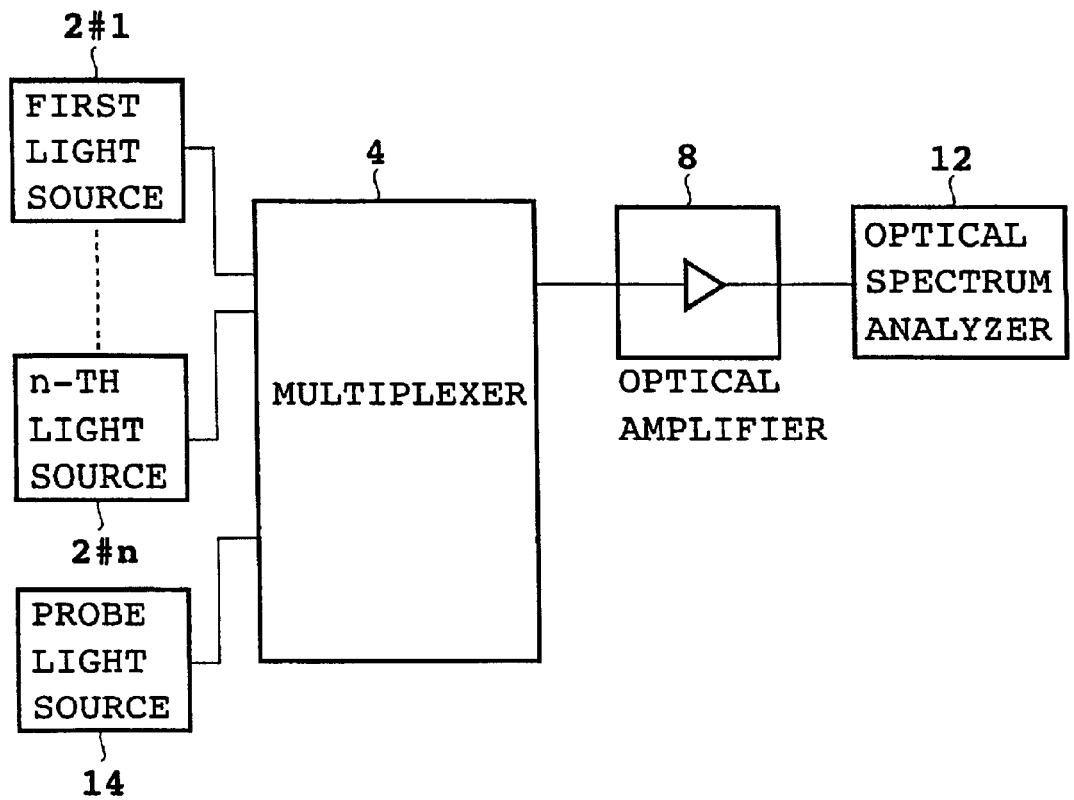
FIG. 3A is a block diagram showing a probe method in the prior art.
Figure 3B:
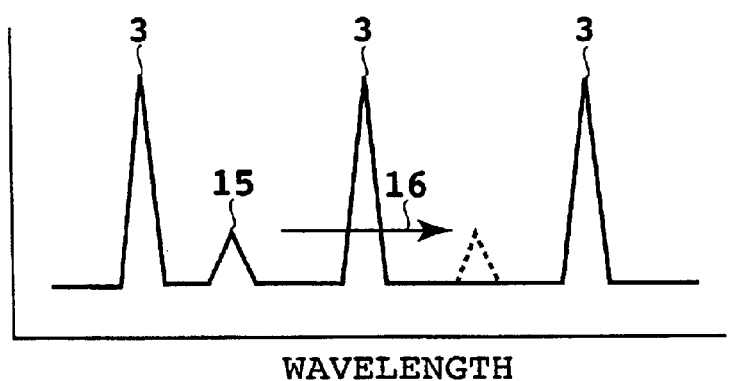
FIG. 3B is a diagram for illustrating the operation of the probe method.
Figure 4A:
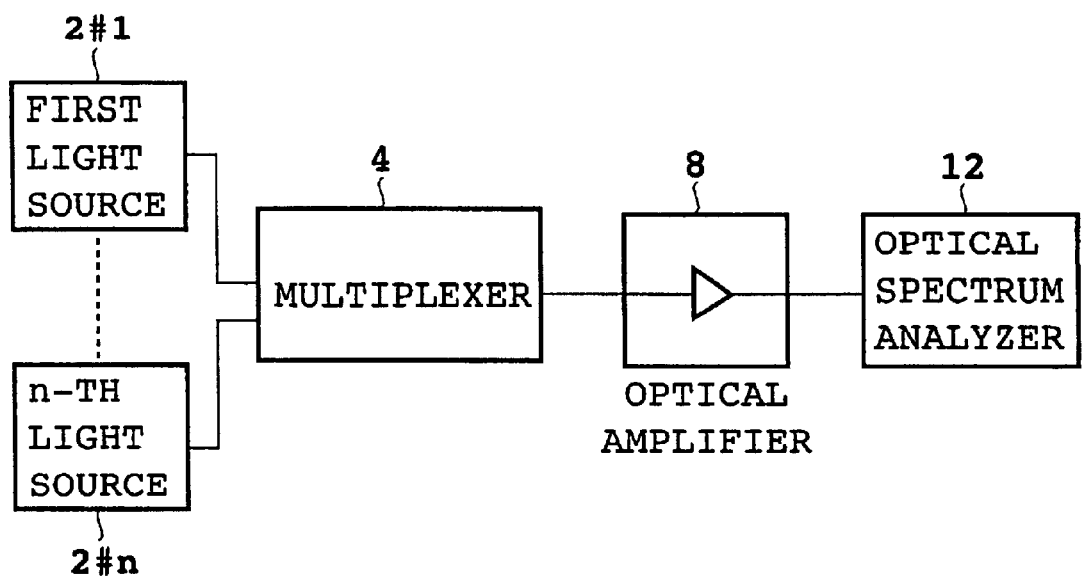
FIG. 4A is a block diagram showing an interpolation method in the prior art.
Figure 4B:
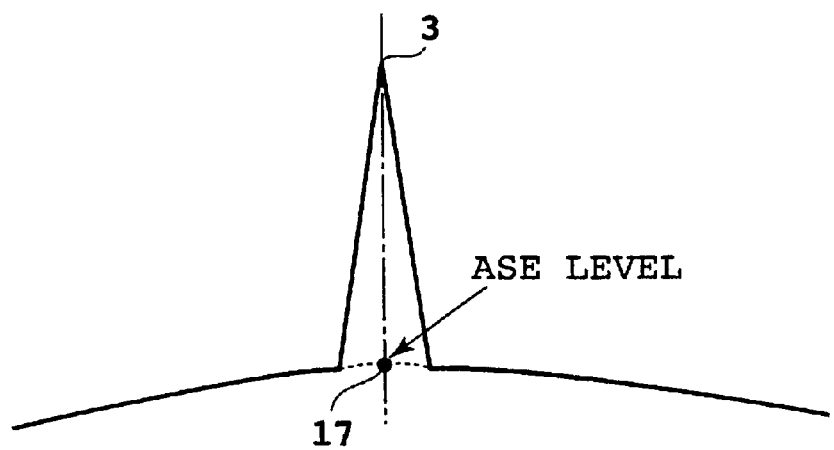
FIG. 4B is a diagram for illustrating the operation of the interpolation method.
Figure 5:
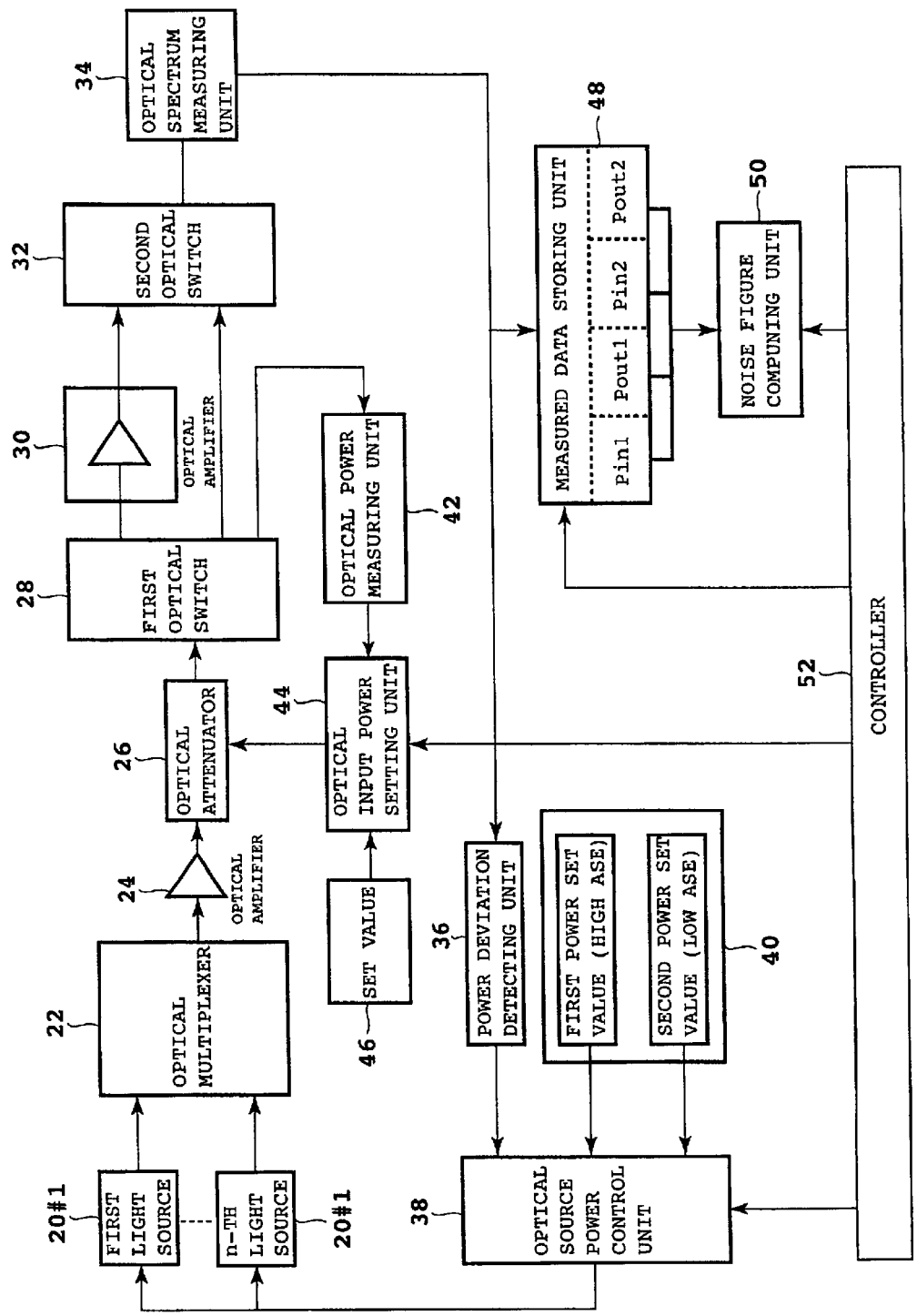
FIG. 5 is a block diagram showing a first preferred embodiment of the present invention.

FIG. 5 is a block diagram showing a first preferred embodiment of the present invention. Reference numerals 20#1 to 20#n denote a plurality of light sources for stabilizing the characteristics of an optical amplifier 30 whose noise figure is to be measured. The light sources 20#1 to 20#n are arranged so as to cover the entire wavelength band of the optical amplifier 30. Accordingly, the characteristics of the optical amplifier 30 in its entire wavelength band can be stabilized. The number of the light sources 20#1 to 20#n may be set to a value much smaller than the number of wavelengths subjected to the measurement. A plurality of optical signals having different wavelengths are output from the light sources 20#1 to 20#n, respectively. These optical signals are wavelength division multiplexed by an optical multiplexer 22, thereby obtaining WDM signal light. The WDM signal light is amplified by an optical amplifier 24, so that ASE light is added to the WDM signal light. The proportion of addition of the ASE light to the WDM signal light may be controlled by changing the output levels of the light sources 20#1 to 20#n to thereby change the input power to the optical amplifier 24.

Output light from the optical amplifier 24 is input into an optical attenuator 26. In the optical attenuator 26, the total input power to the optical amplifier 30 is set to a desired value. More specifically, a first optical switch 28 is operated to be connected to an optical power measuring unit 42 to obtain a difference between a value measured by the optical power measuring unit 42 and a set value stored in a memory 46 and calculate the attenuation of the optical attenuator 26 by an optical input power setting unit 44. Then, the optical input power setting unit 44 controls the optical attenuator 26 so that the input power to the optical amplifier 30 becomes equal to the set value. The first optical switch 28 is operable so as to be selectively connected to the optical amplifier 30, a second optical switch 32, or the optical power measuring unit 42.

The powers of the optical signals to be input into the optical amplifier 30 must be equalized. There is a difference in power between the optical signals to be input into the optical amplifier 30 because of the amplification characteristics of the optical amplifier 24, the wavelength characteristics of the optical attenuator 26, etc. To compensate for such a power difference, the powers of the light sources 20#1 to 20#n are controlled. More specifically, the first and second optical switches 28 and 32 are operated so as to bypass the optical amplifier 30, and the input light to the optical amplifier 30 is measured by an optical spectrum measuring unit 34. A power deviation detecting unit 36 detects the powers of the light sources 20#1 to 20#n from measured data obtained by the optical spectrum measuring unit 34, and calculates a deviation of the detected powers.

Figure 6:
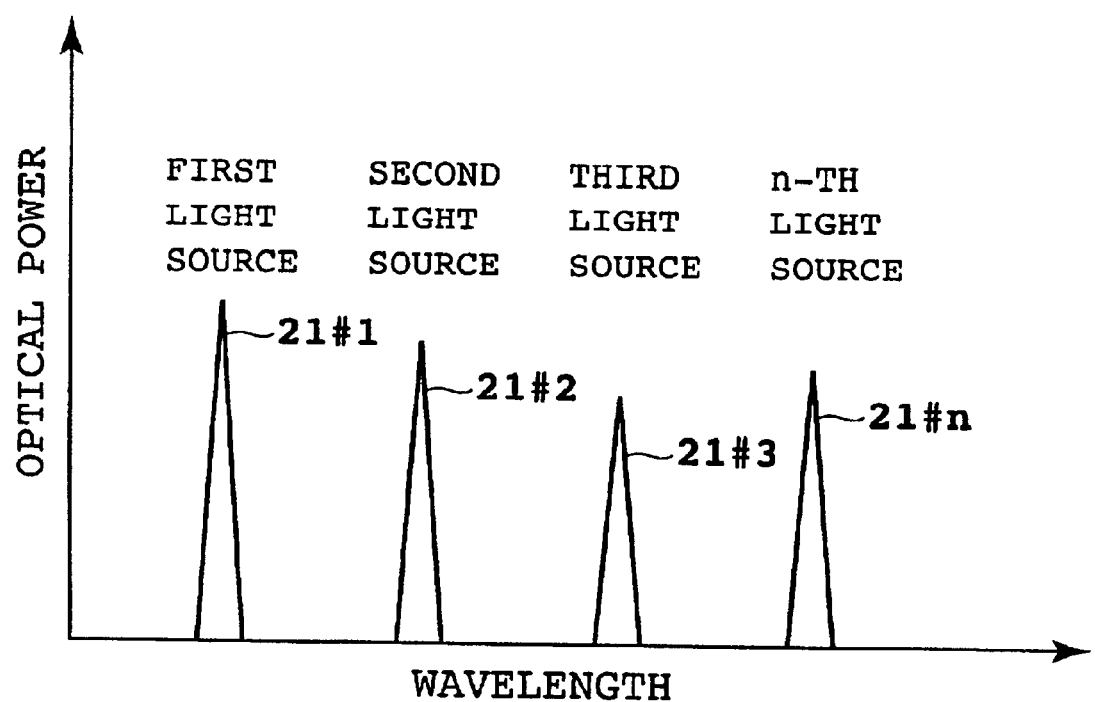
FIG. 6 is a graph showing the optical power of input light to an optical amplifier 26.
Figure 7:
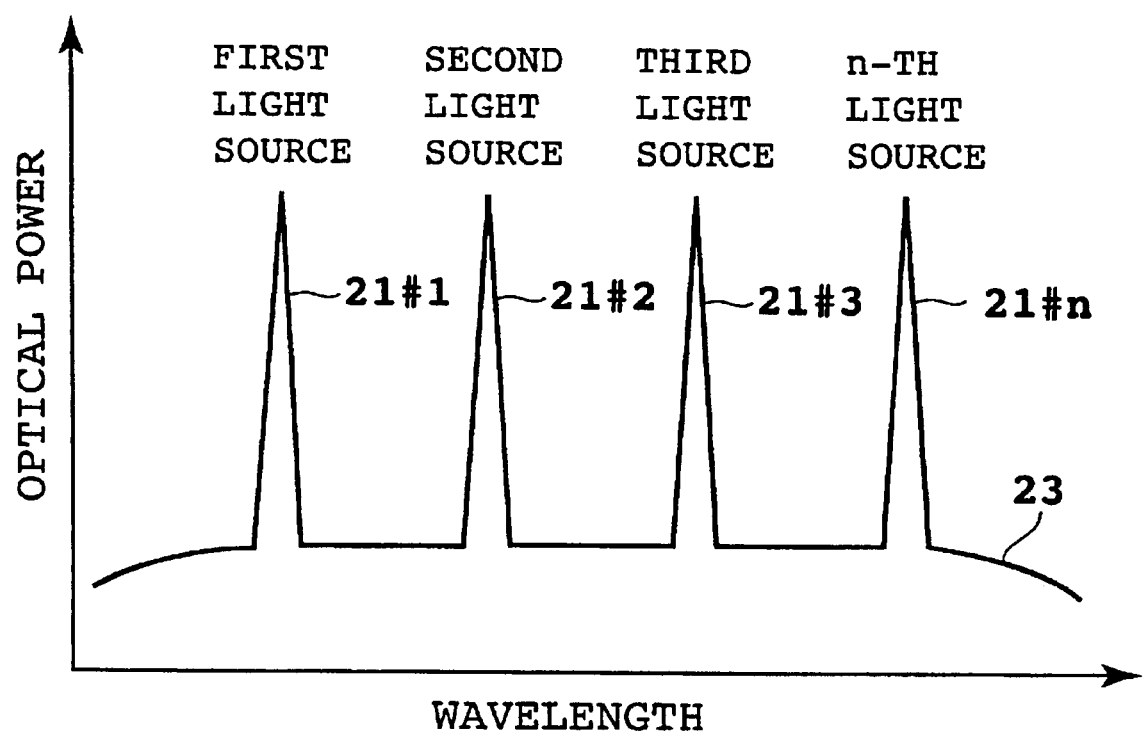
FIG. 7 is a graph showing the optical power of input light to an optical amplifier 30 subjected to measurement.

A light source power control unit 38 controls the output powers of the light sources 20#1 to 20#n according to the power deviation obtained above, thereby making the powers of the optical signals to be input into the optical amplifier 30 substantially equal to each other. For example, even when the input powers to the optical amplifier 24 are not equal to each other as shown by reference numerals 21#1 to 21#n in FIG. 6, the input powers to the optical amplifier 30 can be equalized as shown by reference numerals 21#1 to 21#n in FIG. 7 by amplifying the optical signals at different factors due to the wavelength dependence of the amplification characteristics of the optical amplifier 24. In FIG. 7, reference numeral 23 denotes ASE light.

Figure 8:
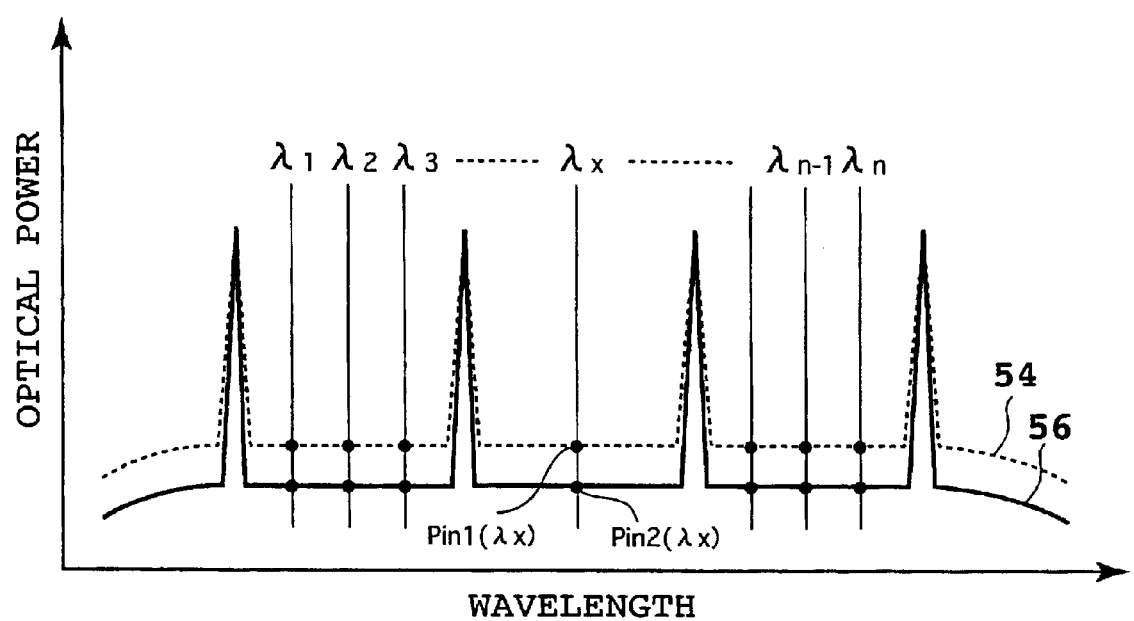
FIG. 8 is a graph showing the optical powers of first and second input lights to the optical amplifier 30.
Figure 9:
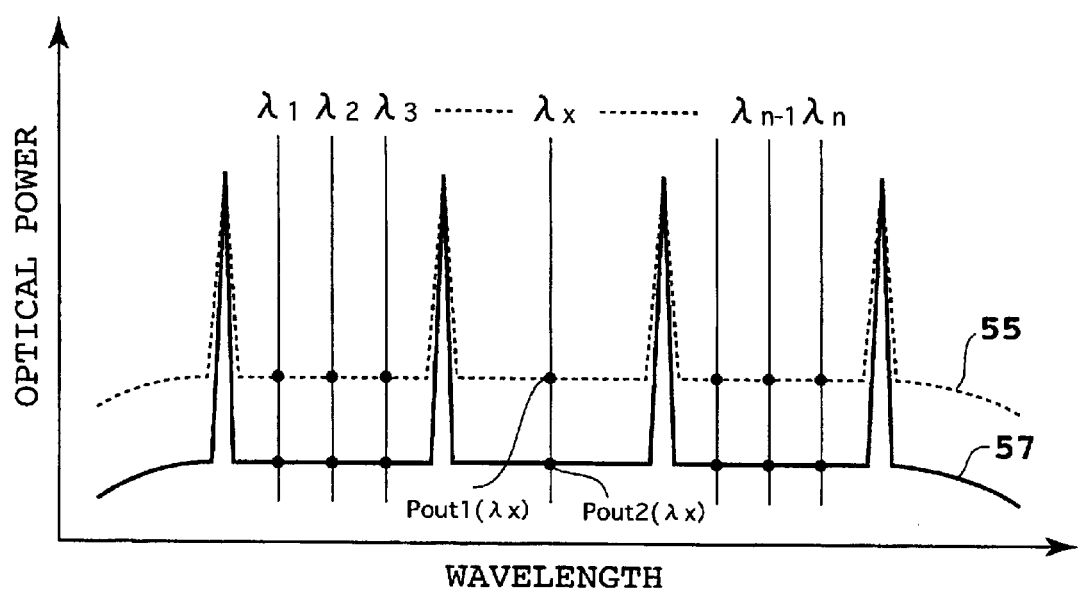
FIG. 9 is a graph showing the optical powers of first and second output lights from the optical amplifier 30.

The signal light including the ASE light is amplified by the optical amplifier 30. Accordingly, the input ASE light is amplified by the optical amplifier 30, and ASE light generated in the optical amplifier 30 is added to the input ASE light to appear in the output from the optical amplifier 30. Two WDM signal lights having the same optical power and different proportions of ASE light are input into the optical amplifier 30 with its amplification factor being unchanged. That is, as shown in FIG. 8, first WDM signal light 54 including a high proportion of ASE light and second WDM signal light 56 including a low proportion of ASE light are input into the optical amplifier 30. The first and second WDM signal lights 54 and 56 are also input into the optical spectrum measuring unit 34 to measure the spectra of optical signals having different wavelengths λ1 to λn of each of the first and second WDM signal lights 54 and 56. Similarly, as shown in FIG. 9, first and second amplified WDM signal lights 55 and 57 from the optical amplifier 30 are input to the optical spectrum measuring unit 34 to measure the spectra of amplified optical signals having different wavelengths λ1 to λn of each of the first and second amplified WDM signal lights 55 and 57. The first amplified WDM signal light 55 output from the optical amplifier 30 corresponds to the first WDM signal light 54 input into the optical amplifier 30, and the second amplified WDM signal light 57 output from the optical amplifier 30 corresponds to the second WDM signal light 56 input into the optical amplifier 30.

The first WDM signal light 54 with high ASE is obtained by driving the light sources 20#1 to 20#n with a first power set value stored in a memory 40, and the second WDM signal light 56 with low ASE is obtained by driving the light sources 20#1 to 20#n with a second power set value stored in the memory 40. Preferably, the first power set value comprises different set values respective for the light sources 20#1 to 20#n, and the second power set value comprises different set values respectively for the light sources 20#1 to 20#n. The first power set value indicates an output power of each of the light sources 20#1 to 20#n in the case of producing input light with high ASE to the optical amplifier 30, and the second power set value indicates an output power of each of the light sources 20#1 to 20#n in the case of producing input light with low ASE to the optical amplifier 30. The first and second power set values may be changed according to conditions.

The light source power control unit 38 sets the output power of each of the light sources 20#1 to 20#n by using the first power set value or the second power set value to change the amount of ASE to be added in the optical amplifier 24. The measured data output from the optical spectrum measuring unit 34 is temporarily stored into a measured data storing unit 48 as a memory. When the measured data corresponding to the cases of the high ASE and the low ASE are stored into the measured data storing unit 48, a noise figure NF at a desired wavelength λx is calculated by a noise figure computing unit 50 in accordance with the following expression.

$$NF(\lambda x) = \frac{Pase(\lambda x)}{G(\lambda x) \cdot h \cdot \upsilon \cdot \Delta \upsilon}$$

where G(λx) is the amplification factor, Pase(λx) is the optical power of ASE light, h is the Boltzmann constant, υ is the optical frequency, and Δυ is the frequency band of the measuring unit 34. G(λx) and Pase(λx) are expressed as follows:

$$G(\lambda x) = \frac{Pout2(\lambda x) - Pout1(\lambda x)}{Pin2(\lambda x) - Pin1(\lambda x)}$$

$$Pase(\lambda x) = Pout2(\lambda x) - Pin2(\lambda x) \cdot G(\lambda x)$$

where Pin1(λx) and Pout1(λx) are the measured data of the input light and the measured data of the output light in the case of high ASE, respectively, and Pin2(λx) and Pout2(λx) are the measured data of the input light and the measured data of the output light in the case of low ASE, respectively.

Figure 10:
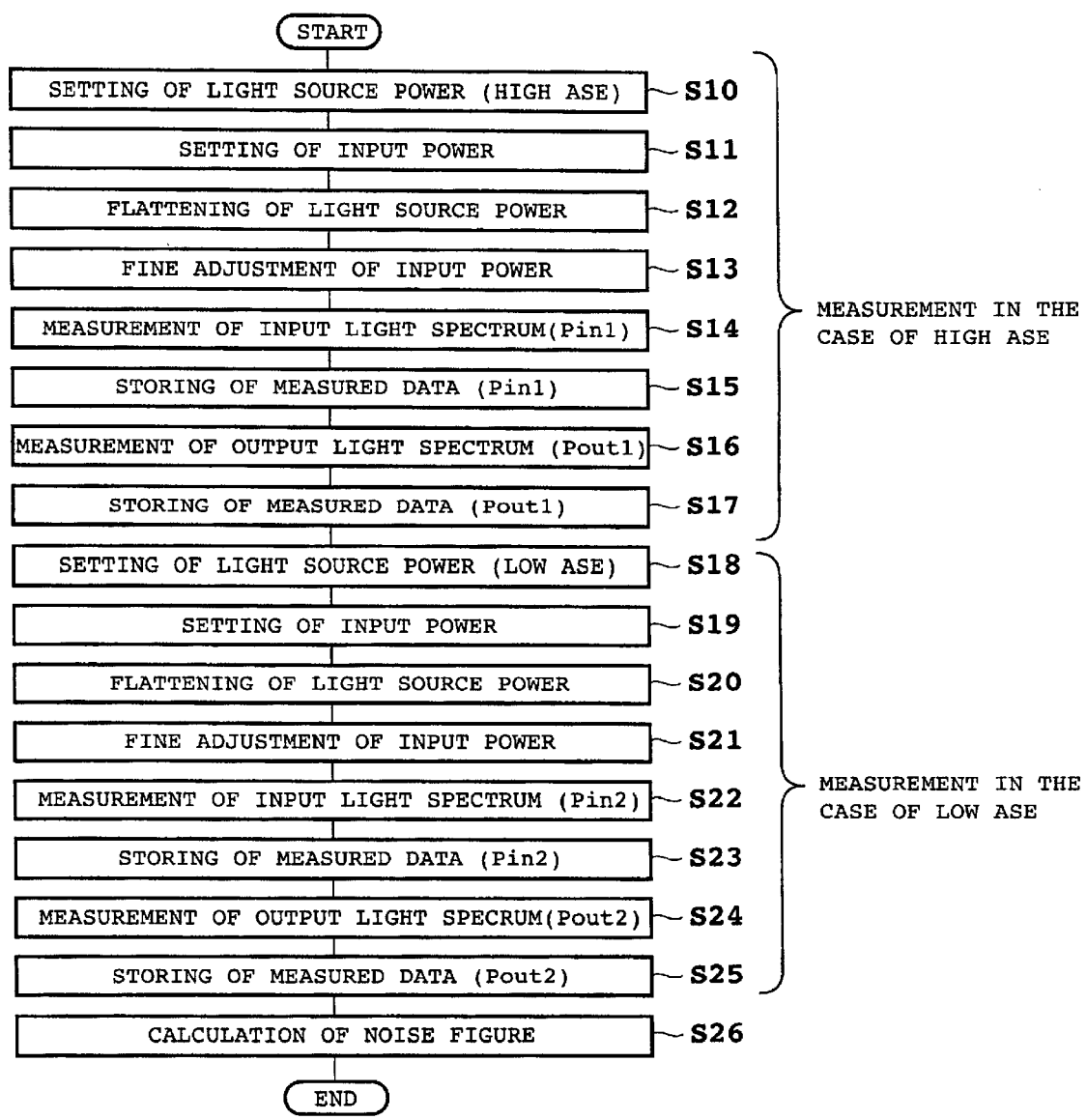
FIG. 10 is a flowchart of noise figure calculation.

The above series of operation is controlled by a controller 52 in accordance with a flowchart shown in FIG. 10. The operation of the present invention will now be described in more detail with reference to the flowchart shown in FIG. 10. In step S10, the powers of the light sources 20#1 to 20#n are set for high ASE. That is, the output powers of the light sources 20#1 to 20#n are set by using the first power set value in the light source power control unit 38.

In step S11, the input power to the optical amplifier 30 is set. That is, the input power to the optical amplifier 30 is measured in the optical power measuring unit 42, and the attenuation in the optical attenuator 26 is calculated in the optical input power setting unit 44 according to the measured value from the optical power measuring unit 42 and the set value stored in the memory 46, thus controlling the optical attenuator 26 to set the input power to the optical amplifier 30 to a desired value. In step S12, the powers of the light sources 20#1 to 20#n to be input into the optical amplifier 30 are flattened. That is, the first and second optical switches 28 and 32 are operated so as to bypass the optical amplifier 30, and the input light to the optical amplifier 30 is measured in the optical spectrum measuring unit 34.

The deviation in power between the optical signals of the input light to the optical amplifier 30 is detected from the measured data in the power deviation detecting unit 36, and the output powers of the light sources 20#1 to 20#n are controlled by the light source power control unit 38 according to the deviation detected, thereby equalizing the powers of the optical signals to be input into the optical amplifier 30. In step S13, the power of the input light to the optical amplifier 30 is finely adjusted by controlling the attenuation in the optical attenuator 26 by the optical input power setting unit 44.

In step S14, the spectrum (Pin1) of the input light to the optical amplifier 30 is measured by the optical spectrum measuring unit 34, and the measured data (Pin1) is stored into the measured data storing unit 48 (step S15). Thereafter, the first and second optical switches 28 and 32 are operated so that the optical amplifier 30 is connected therebetween. In step S16, the spectrum (Pout1) of the output light from the optical amplifier 30 is measured by the optical spectrum measuring unit 34, and the measured data (Pout1) is stored into the measured data storing unit 48 (step S17). These steps S10 to S17 correspond to the measurement in the case of high ASE. Thereafter, steps S18 to S25 are executed for the measurement in the case of low ASE.

In step S18, the powers of the light sources 20#1 to 20#n are set for low ASE. That is, the output powers of the light sources 20#1 to 20#n are set by using the second power set value in the light source power control unit 38. The following steps S19 to S25 are similar to the steps S11 to S17 for the measurement in the case of high ASE mentioned above, so the description of the steps S19 to S25 will be omitted herein. In step S26, the noise figure is calculated according to the measured data (Pin1, Pout1, Pin2, and Pout2) stored in the measured data storing unit 48.

Figure 11:
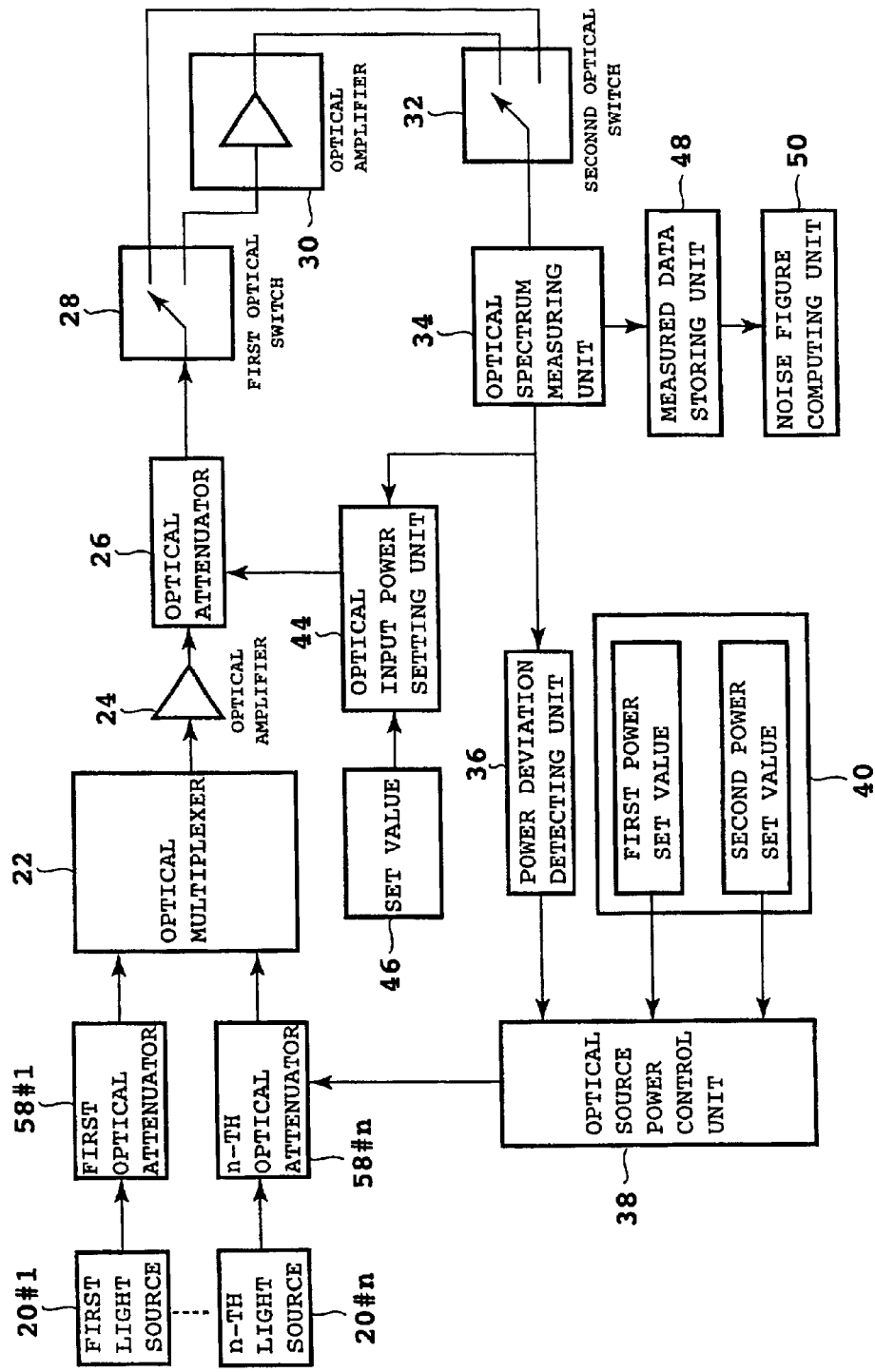
FIG. 11 is a block diagram showing a second preferred embodiment of the present invention.

FIG. 11 is a block diagram showing a second preferred embodiment of the present invention. In this preferred embodiment, a plurality of optical attenuators 58#1 to 58#n are interposed between the light sources 20#1 to 20#n and the optical multiplexer 22, respectively. This preferred embodiment is different from the first preferred embodiment shown in FIG. 5 in that each of the light sources 20#1 to 20#n is driven with a constant power and that each of the optical attenuators 58#1 to 58#n is controlled by the light source power control unit 38 to thereby make the powers of the optical signals of the WDM input signal light to the optical amplifier 30 substantially equal to each other.

Further, the spectrum of the input light to the optical amplifier 30 is measured by the optical spectrum measuring unit 34, and the optical attenuator 26 is controlled by the optical input power setting unit 44 according to the power calculated from the measured value obtained in the unit 34. That is, this preferred embodiment is further different from the first preferred embodiment shown in FIG. 5 in that the optical power measuring unit 42 shown in FIG. 5 is eliminated and that the optical attenuator 26 is controlled according to the measured data from the optical spectrum measuring unit 34. The other configuration of this preferred embodiment is similar to that of the first preferred embodiment, so the description thereof will be omitted herein.

According to the present invention as described above, the noise figure of the optical amplifier for amplifying the WDM signal light can be measured over the entire wavelength band at a time by the simple measuring system not depending upon the number of multiplexed wavelengths. As a result, high-speed measurement can be realized at a low cost.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A noise figure measuring system comprising:
   a first optical amplifier whose noise figure is to be measured;
   a plurality of light sources for outputting a plurality of optical signals having different wavelengths, respectively;
   an optical multiplexer for wavelength division multiplexing said plurality of optical signals output from said light sources to obtain WDM signal light;
   a second optical amplifier for amplifying said WDM signal light output from said optical multiplexer;
   an optical spectrum measuring unit;
   switch means for selectively inserting said first optical amplifier in an optical transmission line between said second optical amplifier and said optical spectrum measuring unit;
   a power deviation detecting unit for detecting a deviation in power between said optical signals of said WDM signal light amplified by said second amplifier and to be input into said first amplifier;
   a light source power control unit connected to said power deviation detecting unit and said light sources for controlling said light sources so that the powers of said optical signals of said WDM signal light to be input into said first optical amplifier becomes substantially equal to each other; and
   a noise figure computing unit for computing the noise figure of said first optical amplifier according to measured data obtained by said optical spectrum measuring unit.

2. A noise figure measuring system according to claim 1, further comprising:
   an optical attenuator provided downstream of said second amplifier;
   an optical power measuring unit for measuring the power of said WDM signal light to be input into said first optical amplifier; and
   an optical input power setting unit for controlling said optical attenuator so that the power measured by said optical power measuring unit becomes a desired value.

3. A noise figure measuring system according to claim 1, wherein said switch means comprises:
   a first optical switch interposed between said first optical amplifier and said second optical amplifier for selectively supplying said WDM signal light from said second optical amplifier to said first optical amplifier; and a second optical switch selectively connectable to said first optical amplifier and said first optical switch.

4. A noise figure measuring system according to claim 1, wherein said measured data comprises data on input power and output power of said first optical amplifier when each of said light sources is driven with a first power set value, and data on input power and output power of said first optical amplifier when each of said light sources is driven with a second power set value higher than said first power set value.

5. A noise figure measuring system according to claim 1, further comprising a memory for storing said measured data obtained by said optical spectrum measuring unit.

6. A noise figure measuring system according to claim 1, wherein said light source power control unit is capable of driving each of said light sources with a first power and a second power higher than said first power.

7. A noise figure measuring system according to claim 6, wherein said measured data comprises data on input power and output power of said first optical amplifier when each of said light sources is driven with said first power, and data on input power and output power of said first optical amplifier when each of said light sources is driven with said second power.

8. A noise figure measuring system comprising:
a first optical amplifier whose noise figure is to be measured;
a plurality of light sources for outputting a plurality of optical signals having different wavelengths, respectively;
an optical multiplexer for wavelength division multiplexing said plurality of optical signals output from said light sources to obtain WDM signal light;
a plurality of first optical attenuators interposed between said plurality of light sources and said optical multiplexer, respectively;
a second optical amplifier for amplifying said WDM signal light output from said optical multiplexer;
an optical spectrum measuring unit;
switch means for selectively inserting said first optical amplifier in an optical transmission line between said second optical amplifier and said optical spectrum measuring unit;
a power deviation detecting unit for detecting a deviation in power between said optical signals of said WDM signal light amplified by said second amplifier and to be input into said first amplifier;
a light source power control unit connected to said power deviation detecting unit and said first optical attenuators for controlling said first optical attenuators so that the powers of said optical signals of said WDM signal light to be input into said first optical amplifier becomes substantially equal to each other; and
a noise figure computing unit for computing the noise figure of said first optical amplifier according to measured data obtained by said optical spectrum measuring unit.

9. A noise figure measuring system according to claim 8, further comprising:
a second optical attenuator provided downstream of said second amplifier; and
an optical input power setting unit interposed between said optical spectrum measuring unit and said second optical attenuator;
said second optical attenuator being controlled by said optical input power setting unit so that the power of said WDM signal light to be input into said first optical amplifier and measured by said optical spectrum measuring unit becomes a desired value.

10. A noise figure measuring system according to claim 8, wherein said switch means comprises:
a first optical switch interposed between said first optical amplifier and said second optical amplifier for selectively supplying said WDM signal light from said second optical amplifier to said first optical amplifier; and
a second optical switch selectively connectable to said first optical amplifier and said first optical switch.

11. A noise figure measuring system according to claim 8, wherein said measured data comprises data on input power and output power of said first optical amplifier when each of said first optical attenuators is controlled so that the output power from each first optical attenuator becomes a first power set value, and data on input power and output power of said first optical amplifier when each of said first optical attenuators is controlled so that the output power from each first optical attenuator becomes a second power set value higher than said first power set value.

12. A noise figure measuring system according to claim 8, further comprising a first memory for storing said measured data obtained by said optical spectrum measuring unit.

13. A noise figure measuring system according to claim 12, further comprising a second memory connected to said light source power control unit and having a first power set value for use in controlling each of said first optical attenuators so that the output power from each first optical attenuator becomes a first power and a second power set value for use in controlling each of said first optical attenuators so that the output power from each first optical attenuator becomes a second power higher than said first power.

14. A noise figure measuring system according to claim 13, wherein said measured data comprises data on input power and output power of said first optical amplifier when each of said first optical attenuators is controlled with said first power set value, and data on input power and output power of said first optical amplifier when each of said first optical attenuators is controlled with said second power set value.

15. A noise figure measuring system comprising:
a first optical amplifier whose noise figure is to be measured;
a plurality of light sources for outputting a plurality of optical signals having different wavelengths, respectively;
an optical multiplexer for wavelength division multiplexing said plurality of optical signals output from said light sources to obtain WDM signal light;
a second optical amplifier for amplifying said WDM signal light output from said optical multiplexer;
an optical spectrum measuring unit capable of selectively measuring output signals from said first and second optical amplifiers;
switch means for selectively connecting said first and second optical amplifiers to said optical spectrum measuring unit;
a power deviation detecting unit connected to said optical spectrum measuring unit for detecting a deviation in power between said optical signals of said WDM signal light to be input into said first amplifier;
a light source power control unit connected to said power deviation detecting unit and said light sources for controlling said light sources so that the powers of said optical signals of said WDM signal light to be input into said first optical amplifier becomes substantially equal to each other;

a memory for storing measured data obtained by said optical spectrum measuring unit; and a noise figure computing unit for computing the noise figure of said first optical amplifier according to said measured data stored in said memory.

16. A noise figure measuring system comprising:

a first optical amplifier whose noise figure is to be measured;

a plurality of light sources for outputting a plurality of optical signals having different wavelengths, respectively;

an optical multiplexer for wavelength division multiplexing said plurality of optical signals output from said light sources to obtain WDM signal light;

a plurality of optical attenuators interposed between said plurality of light sources and said optical multiplexer, respectively;

a second optical amplifier for amplifying said WDM signal light output from said optical multiplexer;

an optical spectrum measuring unit capable of selectively measuring output signals from said first and second optical amplifiers;

switch means for selectively connecting said first and second optical amplifiers to said optical spectrum measuring unit;

a power deviation detecting unit connected to said optical spectrum measuring unit for detecting a deviation in power between said optical signals of said WDM signal light to be input into said first amplifier;

a light source power control unit connected to said power deviation detecting unit and said optical attenuators for controlling said optical attenuators so that the powers of said optical signals of said WDM signal light to be input into said first optical amplifier becomes substantially equal to each other;

a memory for storing measured data obtained by said optical spectrum measuring unit; and a noise figure computing unit for computing the noise figure of said first optical amplifier according to said measured data stored in said memory.

17. A measuring system comprising:

a first optical amplifier subjected to measurement on ASE power or amplification factor;

optical signal outputting means for outputting a plurality of first optical signals having different wavelengths with a first power each and for outputting a plurality of second optical signals having different wavelengths with a second power each;

multiplexing means for wavelength division multiplexing said first optical signals to obtain first WDM signal light and for wavelength division multiplexing said second optical signals to obtain second WDM signal light;

a second optical amplifier for amplifying said first WDM signal light and said second WDM signal light;

power control means for equalizing the powers of said first WDM signal light and said second WDM signal light;

measuring means for measuring the power of said first optical signal having a given wavelength in said first WDM signal light and the power of said second optical signal having said given wavelength in said second WDM signal light after equalization control by said power control means and for measuring the powers of said first and second optical signals at said given wavelength after amplification of said first and second WDM signal lights by said first optical amplifier; and means for computing the ASE power or the amplification factor of said first optical amplifier at said given wavelength from a result of measurement by said measuring means.

18. A measuring system according to claim 17, further comprising control means for equalizing the powers of said first and second optical signals in said first and second WDM signal lights at each of said different wavelengths.

* * * * *